(12) United States Patent
Zhong et al.

(10) Patent No.: US 11,315,273 B2
(45) Date of Patent: Apr. 26, 2022

(54) DISPARITY ESTIMATION METHOD FOR WEAKLY SUPERVISED TRUSTED COST PROPAGATION

(71) Applicants: DALIAN UNIVERSITY OF TECHNOLOGY, Liaoning (CN); PENG CHENG LABORATORY, Guangdong (CN)

(72) Inventors: Wei Zhong, Liaoning (CN); Hong Zhang, Liaoning (CN); Haojie Li, Liaoning (CN); Zhihui Wang, Liaoning (CN); Risheng Liu, Liaoning (CN); Xin Fan, Liaoning (CN); Zhongxuan Luo, Liaoning (CN); Shengquan Li, Liaoning (CN)

(73) Assignees: DALIAN UNIVERSITY OF TECHNOLOGY, Dalian (CN); PENG CHENG LABORATORY, Shenzhen (CN)

(*) Notice: Subject to any disclaimer, the term of this patent is extended or adjusted under 35 U.S.C. 154(b) by 0 days.

(21) Appl. No.: 17/604,239

(22) PCT Filed: Mar. 5, 2020

(86) PCT No.: PCT/CN2020/077960
§ 371 (c)(1),
(2) Date: Oct. 15, 2021

(87) PCT Pub. No.: WO2021/138991
PCT Pub. Date: Jul. 15, 2021

(65) Prior Publication Data
US 2022/0092809 A1    Mar. 24, 2022

(30) Foreign Application Priority Data

Jan. 10, 2020 (CN) .......................... 202010028299.7

(51) Int. Cl.
*G06T 7/55* (2017.01)
*G06T 5/00* (2006.01)
(Continued)

(52) U.S. Cl.
CPC .............. *G06T 7/55* (2017.01); *G06K 9/6215* (2013.01); *G06N 20/00* (2019.01); *G06T 5/002* (2013.01);
(Continued)

(58) Field of Classification Search
None
See application file for complete search history.

(56) References Cited

U.S. PATENT DOCUMENTS

2021/0027081 A1* 1/2021 Zhang ................ G06V 40/166
2021/0042954 A1* 2/2021 Guo .................... G06V 10/751
(Continued)

FOREIGN PATENT DOCUMENTS

CN    103440653 A    12/2013
CN    109241966 A    1/2019
(Continued)

OTHER PUBLICATIONS

Somi Jeong, et al. Convolutional cost aggregation for robust stereo matching. 2017 IEEE International Conference on Image Processing. ICIP 2017. Sep. 30, 2017, pp. 2523-2527.

*Primary Examiner* — Jiangeng Sun
(74) *Attorney, Agent, or Firm* — Muncy, Geissler, Olds & Lowe, P.C.

(57) ABSTRACT

The present invention discloses a disparity estimation method for weakly supervised trusted cost propagation, which utilizes a deep learning method to optimize the initial cost obtained by the traditional method. By combining and making full use of respective advantages, the problems of false matching and difficult matching of untextured regions
(Continued)

in the traditional method are solved, and the method for weakly supervised trusted cost propagation avoids the problem of data label dependency of the deep learning method.

1 Claim, 2 Drawing Sheets

(51) Int. Cl.
*G06N 20/00* (2019.01)
*G06T 5/20* (2006.01)
*G06K 9/62* (2022.01)

(52) U.S. Cl.
CPC ...... *G06T 5/20* (2013.01); *G06T 2207/20228* (2013.01)

(56) References Cited

U.S. PATENT DOCUMENTS

2021/0150745 A1* 5/2021 Yang .................. G06T 7/248
2021/0150747 A1* 5/2021 Liu .................... G06N 3/0454

FOREIGN PATENT DOCUMENTS

| CN | 109816710 A | 5/2019 |
| CN | 110533712 A | 12/2019 |
| WO | WO 2018211127 A1 | 11/2018 |

* cited by examiner

DISPARITY ESTIMATION METHOD FOR WEAKLY SUPERVISED TRUSTED COST PROPAGATION

TECHNICAL FIELD

The present invention belongs to the field of image processing and computer vision, relates to binocular disparity estimation and utilizes a deep learning method to optimize the initial cost obtained by the traditional method. The present invention particularly relates to a disparity estimation method for weakly supervised trusted cost propagation.

BACKGROUND

Depth is a distance from a target to an observer as important spatial information, which can be used to extract some important attributes (such as speed and three-dimensional position) and relationships (such as blocking and transgression) of the target and has important significance for target tracking and behavior perception. Binocular depth perception uses stereo matching to calculate the disparity between the corresponding points of two images. According to the triangulation measurement principle, the depth values of the corresponding points in a scenario are calculated by internal and external parameters of a binocular camera. The existing binocular disparity estimation methods mainly comprise three categories: the first category is a traditional binocular disparity estimation method which is mainly based on geometric constraints and generally divided into matching cost calculation, cost aggregation, disparity estimation and disparity optimization. The most classic method is the SGM (semi-global matching) algorithm, with the characteristic that the cost of each pixel is optimized by the cost of the pixels in corresponding eight direction paths of the corresponding positions, to solve the matching problem of untextured regions to a certain extent. The traditional method is accurate in estimating a sparse disparity, but the limitations are great in estimating a dense disparity, such as many parameters, time and force consumption in adjusting parameters to adapt to different scenarios, difficult feature design and insufficient energy propagation, and the traditional method especially has severe defects in regions of specular reflection, low light, transparency and no texture. The second category is the disparity estimation method based on deep learning, such as searching and matching by features obtained by a network, disparity optimization realized by left and right consistency constraints, and learning supervision. In recent two years, researchers have proposed the method for realizing the energy propagation process by 3D convolution, which further improves the interpretability of the network. In order to solve the problem of data dependency, the researchers propose an unsupervised method using left and right reconstruction consistency, a transfer learning method based on domain adaptation concept and the like. The above data-driven based learning method can obtain a feature model with stronger expression ability. On one hand, semantic information can be fully considered, and on the other hand, more abundant relationship features among pixels can be learned. Therefore, a final disparity diagram is more accurate and smooth than the traditional method, but has the problems of strong data dependency and poor generalization ability of the scenario. The third category is an estimation method that combines deep learning with the traditional method. For example, for the SGM algorithm, the estimation effect of SGM dense disparity can be significantly improved by using the network to automatically allocate penalty coefficients for different scenarios and different pixels. For energy propagation, the literature uses the network to estimate the confidence of each pixel and conduct an energy propagation process according to the confidence. Although these methods that combine deep learning with the traditional method have strong interpretability, they still do not make full use of the respective advantages of the two methods. Therefore, these methods do not show the advantages in accuracy compared with an end-to-end learning method, and do not show the advantages in generalization ability and data dependence degree compared with a sparse matching method.

On the basis of the above problems, the present invention proposes a binocular disparity estimation method which combines deep learning with the traditional method, makes full use of the respective advantages of the traditional method and the deep learning method, optimizes the rough initial cost obtained by the traditional method by using weakly supervised deep learning to obtain an accurate cost diagram and solves a series of problems in the process of obtaining the dense disparity diagram such as difficulty in obtaining true disparity data labels, poor generalization ability across datasets and false matching of untextured and repeated textured regions.

SUMMARY

The present invention aims to overcome the defects of the prior art and provides a disparity estimation method for weakly supervised trusted cost propagation, which combines deep learning with the traditional method, optimizes the initial cost diagram obtained by the traditional method by using a weakly supervised deep learning method and effectively utilizes the respective advantages of the traditional method and the deep learning method to obtain a more accurate disparity diagram.

The specific solution comprises the following steps:

A binocular disparity estimation method based on weakly supervised trusted cost propagation comprises:

step 1, obtaining a sparse and accurate initial cost diagram by the traditional feature matching method, i.e., a non-deep learning method;

step 2, conducting energy propagation; and optimizing the initial cost diagram by a three-dimensional convolutional network;

step 3, conducting disparity regression; converting the optimized initial cost diagram into a probability diagram which is a probability that each pixel belongs to each disparity; then, obtaining a subpixel disparity through Soft Argmax; and finally obtaining a dense disparity diagram.

The present invention has the following beneficial effects:

The present invention proposes a binocular disparity estimation method which combines the traditional disparity estimation with deep learning. By combining and making full use of respective advantages, the problems of false matching and difficult matching of untextured regions in the traditional method are solved, and the method for weakly supervised trusted cost propagation avoids the problem of data label dependency of the deep learning method.

DETAILED DESCRIPTION

Figure 1:
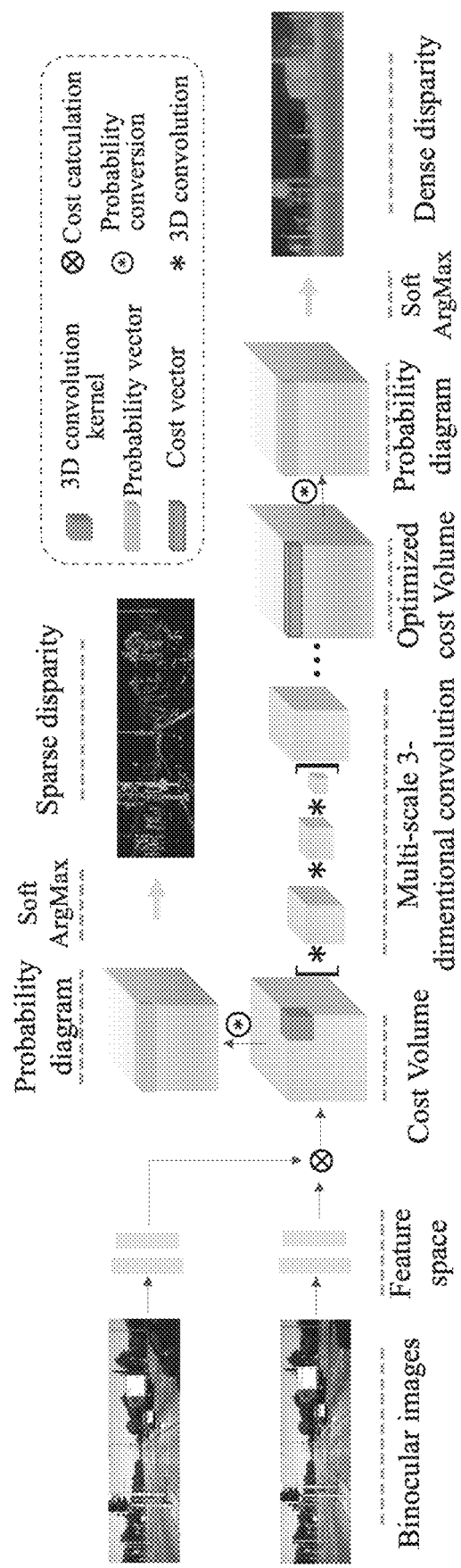
FIG. 1 is an overall flow chart of a solution.
Figure 2:
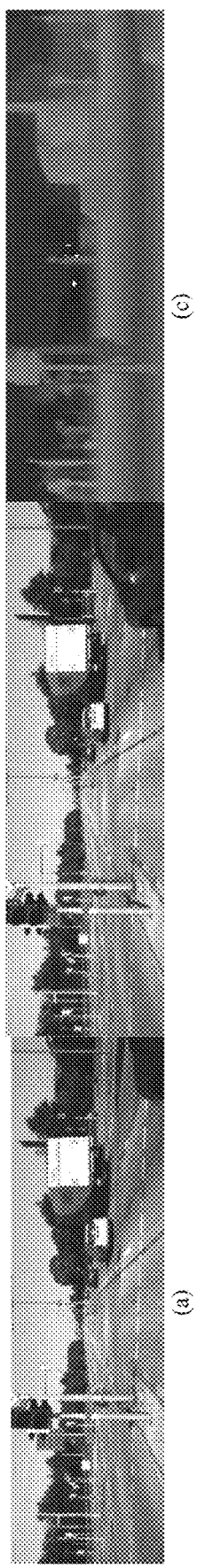
FIG. 2 is an effect diagram of disparity estimation. (a) left diagram, (b) right diagram, and (c) disparity diagram.

To overcome the problems of difficulty in obtaining true disparity data labels, poor generalization ability across datasets and easy false matching of untextured and repeated textured regions in disparity estimation, the present invention proposes a binocular disparity estimation solution based on weakly supervised trusted cost propagation (FIG. 1), comprising the main steps:

Step 1, obtaining a sparse and accurate cost diagram by the traditional feature matching method. By taking a matching method based on Census features as an example, the present invention comprises the following specific steps:

1.1 An input image is denoised and filtered by a Gaussian filtering algorithm. The weight of a Gaussian filtering window is determined by a Gaussian function (formula 1).

$$h(x, y) = e^{-\frac{x^2+y^2}{2\sigma^2}} \qquad (1)$$

wherein (x,y) is a point coordinate and σ is a standard deviation. The Gaussian function is discretized to obtain a weight matrix, i.e., a Gaussian filter.

Through Gaussian filtering, noise can be effectively suppressed and the image is smoothed. Subsequent matching errors caused by the noise are prevented.

1.2 The input image is matched to obtain the initial cost diagram with sparse and accurate disparity.

Initial cost calculation is conducted. Sliding window matching based on Census features is taken as an example herein to describe the flow of matching cost calculation.

A Census feature descriptor of each pixel is obtained. A sliding window is used for search on a scanning line to calculate the cost corresponding to the possible disparity of each pixel (formula 2):

$$\text{Cost}_{d, d \in D_{max}}(x, y) = HD(\text{Census}L(x, y), \text{Census}R(x-d, y)) \qquad (2)$$

In the formula, HD(•) represents a Hamming distance, and CensusL and CensusR are respectively Census feature descriptors of a left diagram pixel and a right diagram pixel. The output of cost calculation is a tensor of size height (H)×width (W)×maximum disparity (D), i.e., the cost diagram.

Step 2, conducting energy propagation. The traditional energy propagation model is based on manual prior features, has limited description capability, cannot conduct effective energy propagation in the same plane in which the texture is too rich or the scenario includes many untextured and weakly textured regions, and is easy to cause false matching. The present invention optimizes the cost diagram through the three-dimensional convolutional network by utilizing strong advantages of feature representation and context learning of deep learning. The input is the intermediate output of 1.2, i.e., a four-dimensional tensor composed of similarity feature vectors of each pixel relative to each possible matching point. A loss function corresponding to an energy propagation network is:

$$\text{loss} = \sum_{x \in \Omega} \left\| I_x^l - \tilde{I}_x^l \right\|$$

wherein Ω is a point beyond a sparse point set, $I_x^l$ is a point x on the left diagram, and $\tilde{I}_x^l$ is a point x on the left diagram reconstructed according to the right diagram and the disparity.

Step 3, conducting disparity regression. A similarity tensor is converted into a probability tensor by a network (i.e., a probability that each pixel belongs to each disparity); and a subpixel disparity is obtained through Soft Argmax. In practical application, the method only needs to input the left diagram and the right diagram, and can output a sparse disparity diagram or a dense disparity diagram as required.

The invention claimed is:

1. A binocular disparity estimation method based on weakly supervised trusted cost propagation, comprising the following steps:
   step 1, obtaining a sparse and accurate initial cost diagram by the traditional feature matching method, i.e., a non-deep learning method;
   step 2, conducting energy propagation; and optimizing the initial cost diagram by a three-dimensional convolutional network;
   step 3, conducting disparity regression; converting the optimized initial cost diagram into a probability diagram which is a probability that each pixel belongs to each disparity; then, obtaining a subpixel disparity through Soft Argmax; and finally obtaining a dense disparity diagram,
   wherein step 1 of using the traditional feature matching method which is a matching method based on Census features specifically comprises the following steps:
   1) denoising and filtering an input image by a Gaussian filtering algorithm, and determining the weight of a Gaussian filtering window by a Gaussian function, formula (1);

$$h(x, y) = e^{-\frac{x^2+y^2}{2\sigma^2}} \qquad (1)$$

wherein (x,y) is a point coordinate and σ is a standard deviation; discretizing the Gaussian function to obtain a weight matrix, i.e., a Gaussian filter;
   2) matching the input image to obtain the initial cost diagram with sparse and accurate disparity;
   conducting initial cost calculation; obtaining a Census feature descriptor of each pixel, and using a sliding window for search on a scanning line to calculate the cost $\text{Cost}_{d, d \in Dmax}$ (x,y) corresponding to the possible disparity of each pixel:

$$\text{Cost}_{d, d \in D_{max}}(x, y) = HD(\text{Census}L(x, y), \text{Census}R(x-d, y)) \qquad (2)$$

in the formula, HD(•) represents a Hamming distance, and CensusL and CensusR are respectively Census feature descriptors of a left diagram pixel and a right diagram pixel; and the output of cost calculation is a tensor of size height(H)×width(W)×maximum disparity (D), i.e., the initial cost diagram.

\* \* \* \* \*